United States Patent [19]
Lapp et al.

[11] Patent Number: 5,105,110
[45] Date of Patent: Apr. 14, 1992

[54] LINEAR INDUCTION MOTOR SECONDARY

[75] Inventors: Stephen P. Lapp, Odessa; Ronald F. Van Huuksloot, Kingston, both of Canada

[73] Assignee: UTDC Inc., Kingston, Canada

[21] Appl. No.: 432,999

[22] Filed: Nov. 8, 1989

[51] Int. Cl.⁵ .......................................... H02K 41/02
[52] U.S. Cl. ...................................... 310/12; 104/294
[58] Field of Search .................. 310/12; 104/285, 287, 104/292, 294

[56] References Cited

U.S. PATENT DOCUMENTS

| | | | |
|---|---|---|---|
| 3,803,466 | 4/1974 | Starkey | 318/135 |
| 3,974,778 | 8/1976 | Black et al. | 104/148 LM |
| 4,061,089 | 12/1977 | Sawyer | 310/12 |
| 4,652,800 | 3/1987 | Fukuwatari | 318/135 |
| 4,665,349 | 5/1987 | Matsuo | 318/135 |
| 4,690,066 | 9/1987 | Morishita et al. | 104/282 |
| 4,700,119 | 10/1987 | Karita | 318/587 |
| 4,709,639 | 12/1987 | Geais | 104/292 |
| 4,716,346 | 12/1987 | Matsuo | 318/38 |
| 4,800,818 | 1/1989 | Kawaguchi et al. | 104/290 |

FOREIGN PATENT DOCUMENTS

| | | |
|---|---|---|
| 0160523 | 6/1985 | European Pat. Off. . |
| 0158114 | 10/1985 | European Pat. Off. . |
| 0186103 | 7/1989 | Japan ................ 104/285 |
| 0724376 | 3/1980 | U.S.S.R. ............. 104/285 |
| 1512822 | 10/1989 | U.S.S.R. ............. 104/285 |

Primary Examiner—Steven L. Stephan
Assistant Examiner—Judson H. Jones
Attorney, Agent, or Firm—Fleit, Jacobson, Cohn, Price, Holman & Stern

[57] ABSTRACT

A linear induction motor (LIM) secondary is provided. The LIM secondary includes a thermally and electrocally conductive non-ferromagnetic top cap having one side defining a substantially smooth, continuous planar surface to be spaced from a LIM primary. The other side of the top cap has a plurality of evenly spaced fins projecting therefrom. The fins project otrhogonally from the other side of the top cap and extend longitudinally along the length of the top cap, thereby defining a plurality of separated longitudinally extending channels. Bars of magnetizable back iron are disposed in the channels and extend substantially along the length thereof. Each of the bars is fastened to the top cap via a single centrally located fastening pin. The fins project beyond the exposed surface of the bars to define air channels and also to provide structural reinforcement for the LIM secondary to counter distortion of the top cap resulting from heat and/or electro-mechanical stress. Fasteners are also provided for securing the LIM secondary to a vehicle chassis.

20 Claims, 6 Drawing Sheets

LINEAR INDUCTION MOTOR SECONDARY

The present invention relates to linear induction motors and in particular to a linear induction motor secondary and top cap therefor.

Linear induction motors (LIM's) are well known in the art and are used in various transportation environments. However, these types of motors have been costly to construct and subject to heating and electro-mechanical stress problems which result in adverse effects on the performance of the motors. To overcome the heating problems encountered in the LIM primaries, cooling systems have been designed such as that described in U.S. Pat. No. 4,727,387 assigned to the Urban Transportation Development Corporation Limited. Also, been made such as is described in U.S. patent application Ser. No. 087,127 assigned to Urban Transportation Development Corporation Limited in order to reduce distortion problems and cost and to improve motor efficiency. Although the proposals described in these references reduce the effect of electro-mechanical stress and heating problems, it is an ongoing concern to counter as much as possible these effects on Linear Induction motors.

Traditional reaction rails which form the LIM secondary comprise a conductive, non-ferromagnetic top cap and a thin laminate or solid back iron body, the two of which are bonded, welded, rivetted, prestressed, clamped or otherwise fastened together to form a single assembly. Heating and/or electro-mechanical stresses in the LIM motors cause warping of the LIM secondary due to the relative thermal expansion between the dissimilar materials forming the LIM secondary when the dissimilar materials experience temperature variations. Distortion of the LIM secondary top cap also occurs due to the electro-mechanical forces of the LIM primary on the LIM secondary. The distortion of the LIM secondary results in variations of the air ga formed between the LIM primary and LIM secondary. A consequence of the distortion is a variance in the motor efficiency and noise resulting from the correction of the distortion when the electro-mechanical forces are removed from the LIM secondary by the movement of the LIM secondary away from the LIM primary.

The thermal expansion and electro-mechanical forces cause shear stresses in the fastening arrangement of the back iron body to the top cap. The shear stresses result in distortion of the LIM secondary if the structural design and/or support structure attachment means for the LIM secondary so permits. If the structural design and/or attachment means do not prevent distortion, the shear stresses may rise to the point where the top cap separates from the back iron body.

Since the efficiency and thrust of a Linear Induction Motor is highly dependent on the air gap separating the LIM primary from the LIM secondary, any deflection in the LIM secondary adversely effects the LIM performance. Another problem exists in conventional LIM secondaries in that the cyclic thermally induced stresses caused by the linear motion of LIM secondary over the LIM primary tend to cause fatigue in the joints and bonds thereof, thereby resulting in their eventual failure. Accordingly, traditional LIM secondaries which have a tendency to distort, separate or fatigue due to heating and stress, do not satisfactorily meet the needed requirements.

It is therefore an object of the present invention to obviate or mitigate the above disadvantages by providing a novel linear induction motor secondary.

According to the present invention, there is provided a top cap for a linear induction motor secondary, said top cap being formed from thermally and electrically conductive non-ferromagnetic material and having one side defining a surface to be spaced from a linear induction motor primary, the other side of said top cap including a plurality of spaced fins projecting therefrom, said fins extending along said top cap thereby defining a plurality of channels, said channels for receiving segments of a back iron core.

In another aspect of the present invention there is provided a linear induction motor secondary comprising:

a top cap formed from thermally and electrically conductive non-ferromagnetic material, said top cap having one side defining a surface to be spaced from a linear induction motor primary, the other side of said top cap having a plurality of spaced fins projecting therefrom, said fins extending along said top cap thereby defining a plurality of channels; and a plurality of elements formed from magnetizable material, said elements being disposed in said channels and fastened to said top cap.

Preferably the top cap is formed from either aluminum or copper and the fins project orthogonally from the other side of the top cap. It is preferred that the fins are evenly spaced to accept the elements of magnetizable material, the elements of magnetizable material being formed from back iron bars and dimensioned in accordance with Applicant's co-pending U.S. application Ser. No. 087,127, the contents of which are incorporated herein by reference. This provides for an economical construction of the LIM secondary and results in an electrically efficient motor. Each of the back iron bars is connected to the top cap via a substantially centrally located fastening pin to prevent stress arising from the differential expansion between the back iron bars and the top cap.

Preferably, the fins project beyond the exposed surface of the back iron bars to form air channels parallel to the direction of travel of the vehicle. This provides forced convection cooling of the LIM secondary. The provision of the fins also provides reinforcement for the top cap thereby reducing the amount of external structure required to resist distortions due to thermal and/or electro-mechanical forces.

The present linear induction motor secondary is secured directly to the vehicle chassis at one end and secured to the vehicle chassis at the other end by a link mechanism. This permits the transfer of propulsive and braking forces from the LIM secondary to the vehicle chassis when the linear induction motor secondary is used in LIM in track systems and accommodates expansion of the LIM secondary due to heat.

Also, other advantages exist in the present LIM secondary in that the single point of attachment of the back iron bars to the top cap permits the top cap and back iron bars to expand in substantially all directions independent of one another and hence, reduces substantially all shear and fatigue stresses. This of course, reduces substantially any distortion of the LIM secondary, particularly in the top cap.

An embodiment of the present invention will be now be described by way of example only with reference to the accompanying drawings in which.

Figure 1:
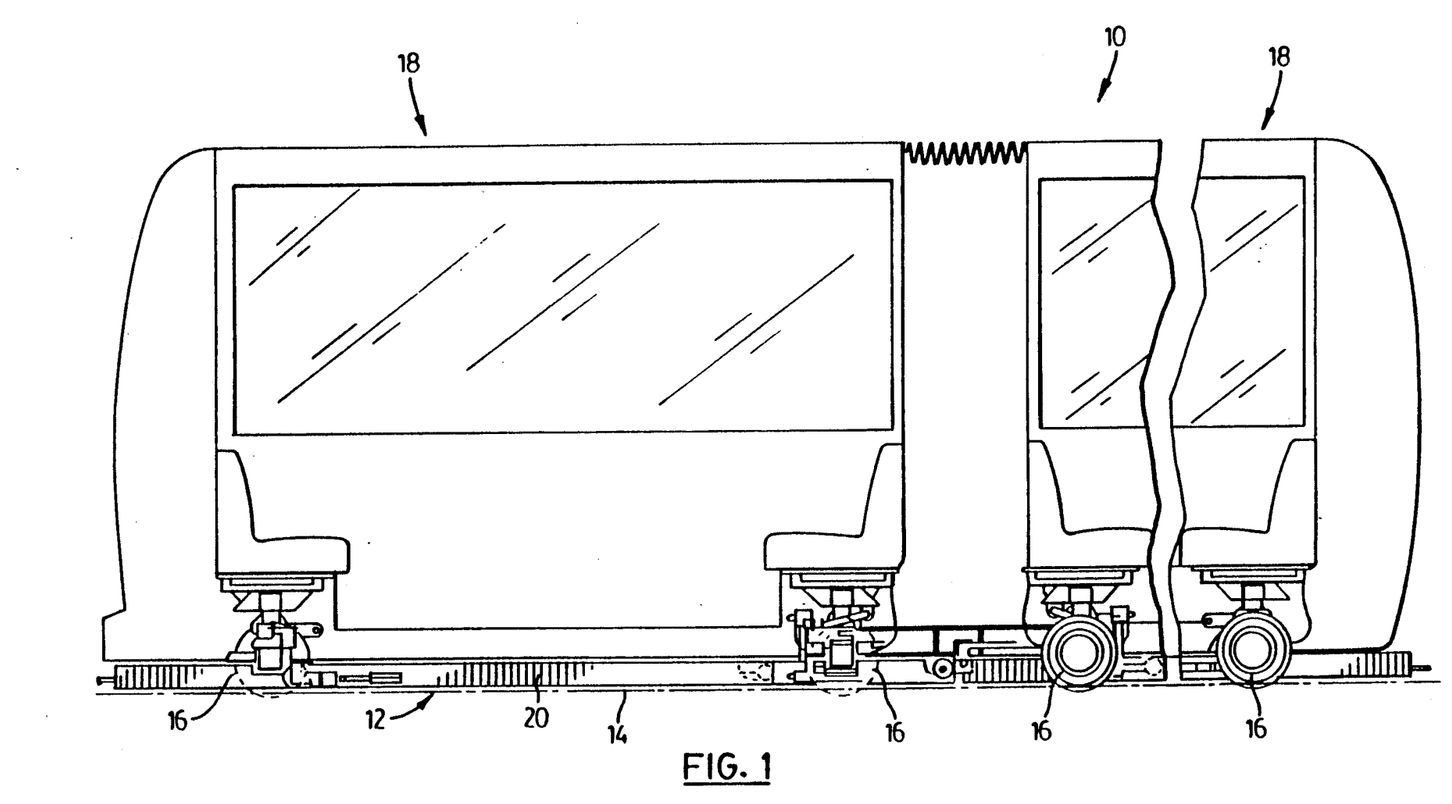
FIG. 1 is a side view of a transportation system including a plurality of vehicles.
Figure 2:
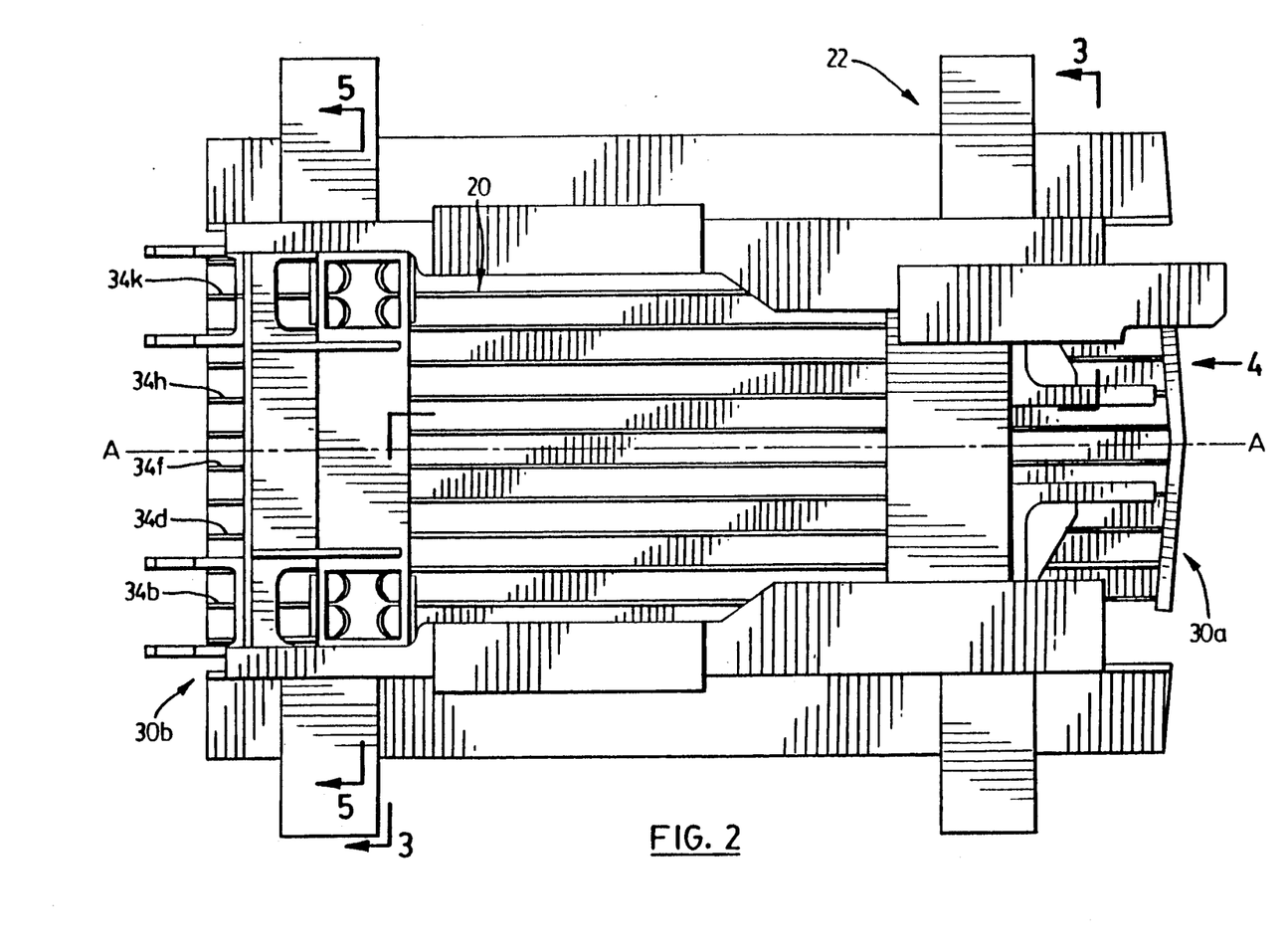
FIG. 2 is a plan view of a portion of one of the vehicles illustrated in FIG. 1.
Figure 3:
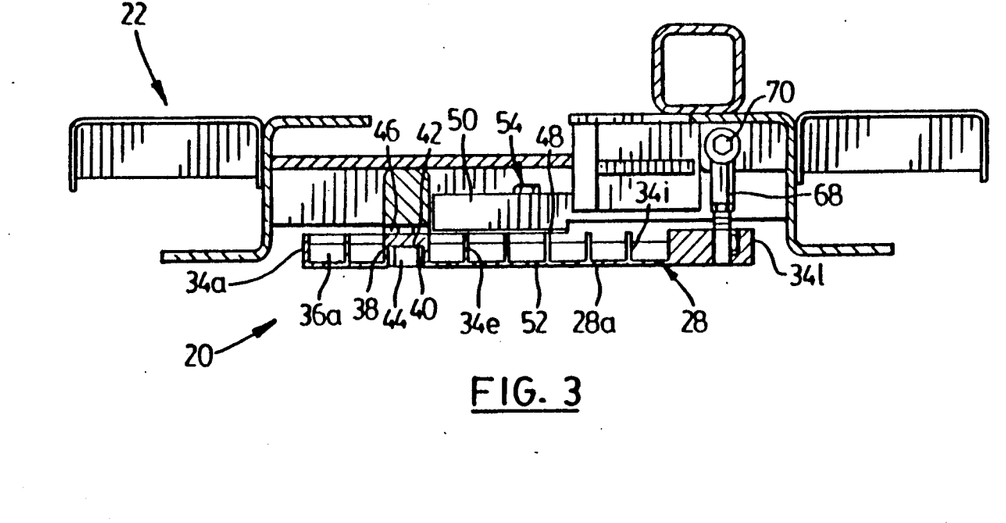
FIG. 3 is a partial sectional view of FIG. 2 taken along line 3—3 and rotated by 90°.
Figure 4:
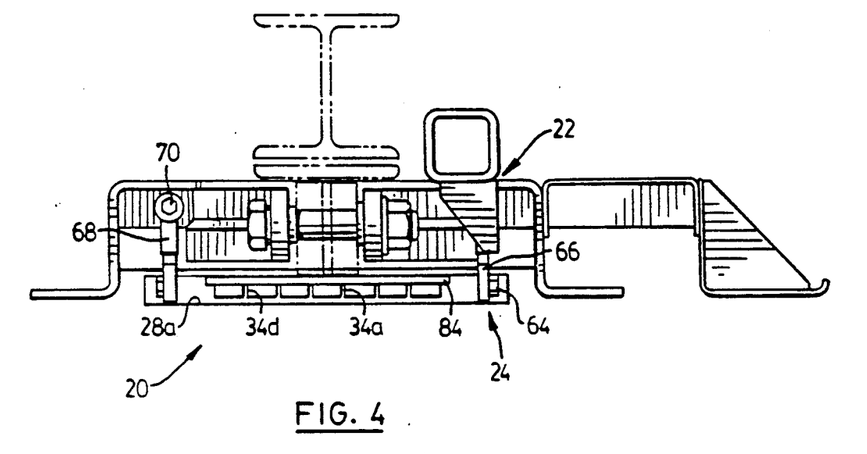
FIG. 4 is a front view of FIG. 2 taken in the direction of arrow 4.
Figure 5:
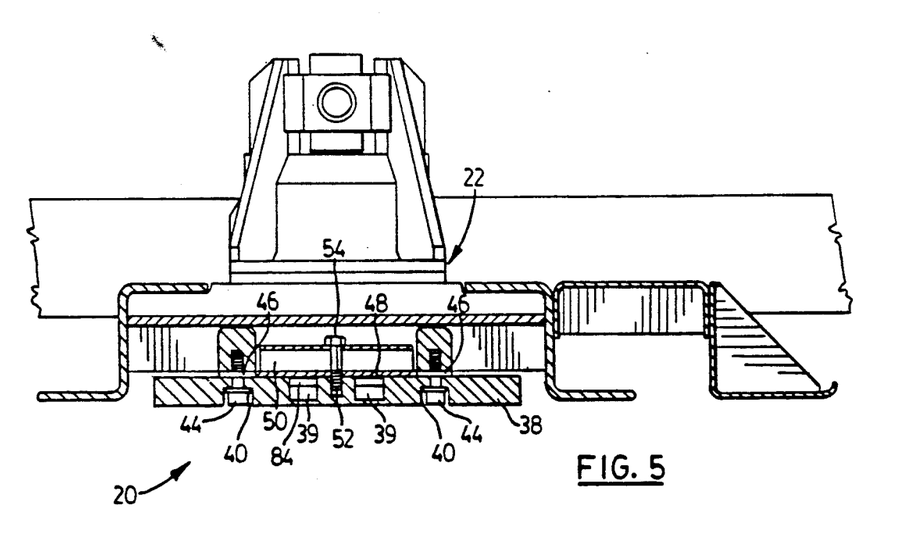
FIG. 5 is a sectional view of a portion of FIG. 2 taken along line 5—5.
Figure 6:
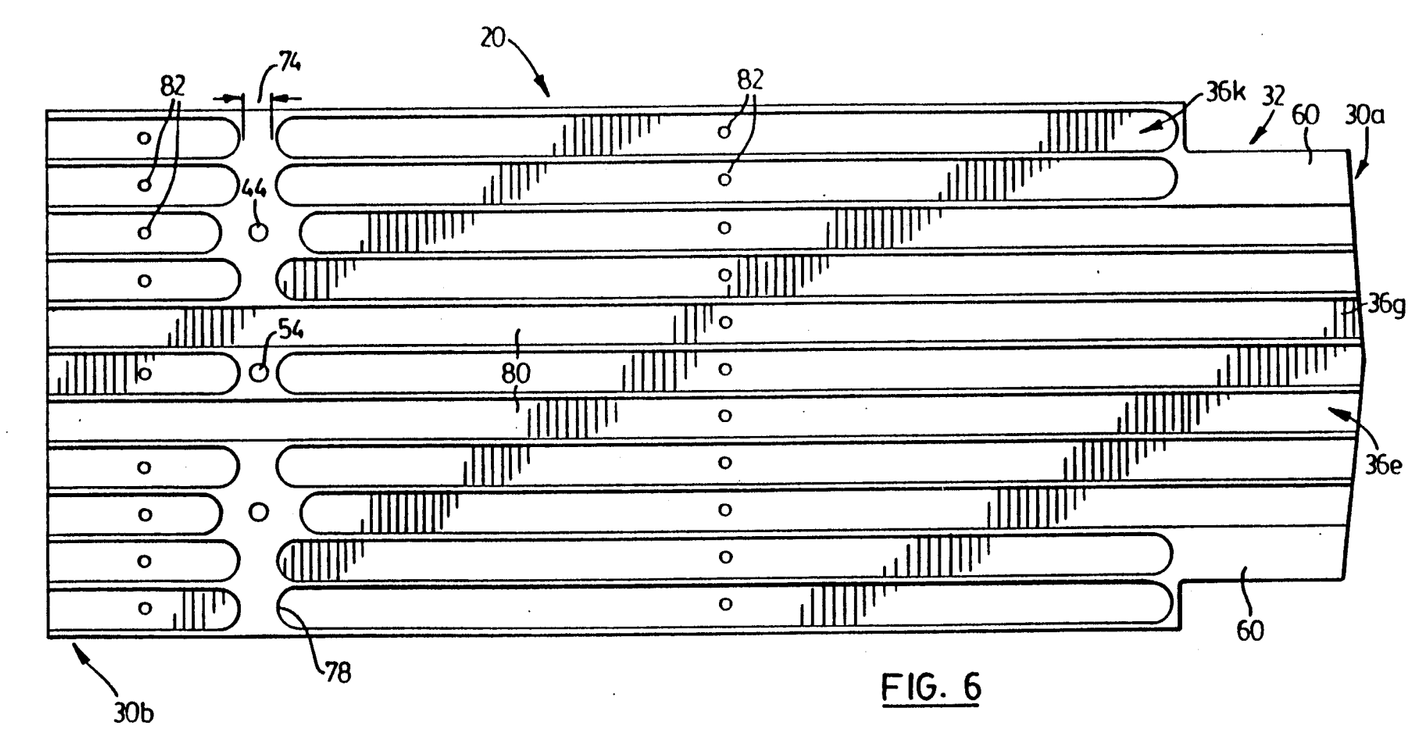
FIG. 6 is a top plan view of a portion of FIG. 2.
Figure 7:
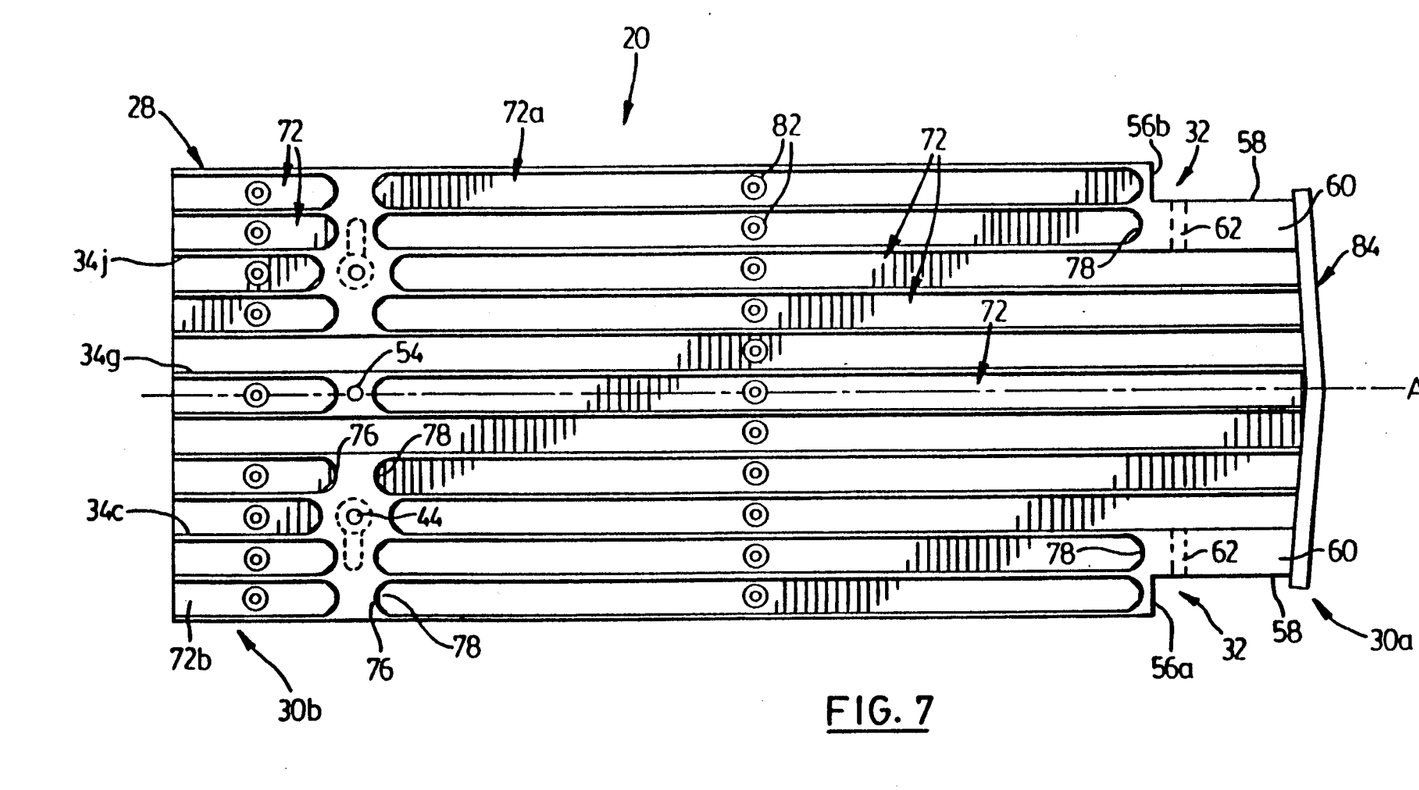
FIG. 7 is a bottom plan view of the portion illustrated in FIG. 6.

Referring to FIG. 1, a transportation system is shown and generally indicated by reference numeral 10. The system 10 includes a track 12 having a pair of rails 14, although only one rail is shown, which support the wheel sets 16 of a plurality of interconnected vehicles 18 forming a train. Linear Induction Motor LIM primaries (not shown) are disposed between the rails 14 and are spaced at intervals along the track 12. The LIM primaries energize LIM secondaries 20 that are provided in the locations indicated on each vehicle 18 to provide thrust to the vehicles 18 in a known manner.

Referring now to FIGS. 2 to 7, a portion of a single vehicle 18 is shown, better illustrating one of the LIM secondaries 20. The LIM secondary 20 is connected to the chassis 22 of the vehicle 18 via a number of fasteners and extends along the longitudinal axis A—A of the vehicle 18. The LIM secondary comprises mainly two major components, namely a top cap 24 and a segmented magnetizable back iron core 26. The design of the LIM secondary 20 is such that the segments of magnetizable core 26 are of the maximum length permitted by the length of the vehicle 18 while providing for articulations of the vehicles operating in the train over curved portions of the track 14. This allows the LIM motor efficiency to be maximized within the constraints of vehicle size and operational efficiency.

The top cap 24 is formed from a thermally and electrically conductive non-ferromagnetic material such as, for example, aluminum and includes a plate 28. The plate 28 is substantially rectangular in shape although one end 30a of the plate 28 forms an apex which lies on the longitudinal axis A—A. The apex design provides for the maximum length of the segments of back iron core in relation to the vehicle articulation constraints mentioned above. A section of each side of the plate 28 is removed at the one end 30a to define recesses 32. The recesses 32 facilitate the coupling of the LIM secondary 20 to the chassis 22, the details of which will be described herein.

The lower surface 28a of the plate 28 defines a substantially smooth, continuous, planar surface which is spaced from the LIM primaries to form a suitable and substantially constant air gap therebetween. The upper surface 28b of the plate 28 has a plurality of evenly spaced fins 34a to 34l projecting orthogonally therefrom and provides support for the segments of back iron core material 26. The fins 34a to 34l extend substantially parallel to the longitudinal axis A—A and are integrally formed with the top cap 24 to define a plurality of evenly spaced longitudinally extending channels 36a to 36k.

In the present design of the plate 28, the other end 30b of the plate does not enclose the segments of back iron core 26 but rather allows for free expansion of the back iron segments and permits the length of the segments to be maximized. A solid rectangular bar 38 integrally formed with the plate 28 extends transverse to the fins 34 and is located near the other end 30b. Passages 39 are formed through the bar 38 to allow two of the segments of back iron core that are disposed on the plate 28 to extend the entire length of the plate. Housings 40 extending upwardly from the lower surface of the plate 28 are formed in the bar 38. Bolts 44 rest in the housings and pass through the bar 38 and through steel shims 46 to become threadably engaged with the chassis 22. The depth of the housings 40 are chosen so that the bolts 44 are countersunk and do not extend below the planar surface defined by the lower surface of the plate 28. Another shim 48 extends across the tops of the fins 34d to 34i between the two shims 46 and abuts against a support 50 provided on the chassis 22. A threaded bore 52 located on the longitudinal axis A is provided through the shim 48 and receives a bolt 54 passing downwardly through the support 50.

With the objective of providing the maximum length of back iron core 26 possible within the design constraints of the vehicle, the inner fins 34b to 34k extend along the entire length of the top cap 24 while the outer fins 34a and 34l are reduced in length due to the necessary provision of the recesses 32 at the one end 30a. Wall portions 56a and 56b interconnect the fins 34a and 34l to the sides of fins 34b and 34k respectively. Thus, the wall portions 56a, 56b and a portion 58 of the fins 34b, 34c define walls bordering the recesses 32. A portion 60 of each of the channels 36b and 36j near the one end 30a is solid. A threaded bore 62 is provided through each wall 58 and extends through the solid portions 60 of the channel. Bolts 64 engage with the threaded bores 62 and secure one end of upwardly extending rods 66 to the walls 58 so that the rods 66 and bolts 64 do not extend beyond the outer fins 34a and 34l respectively. The other end of the rods 66 are threadably engaged with second rods 68 that are secured to the chassis 22 via bolts 70.

The channels 36a to 36d, 36f and 36h to 36k house a pair of spaced coarsely laminated back iron bars 72, one bar 72a in each channel being substantially longer than the other 72b. The channels are dimensioned to hold back iron bars having dimensions determined by the propulsion requirements of the vehicle 18. Accordingly, the back iron bar thickness is selected to give a desired thrust performance for the LIM primary. The bars as is described in the Applicant's co-pending application which is incorporated herein by reference, are thick and grossly laminated yet allow the LIM to perform close to that of a LIM having a finely laminated back iron core. The space 74 provided between the bars 72a and 72b in these channels due to the provision of the bar 38 allows the bolts 44 and bolt 54 to secure the one end 30b of the LIM secondary to the vehicle without passing through any magnetizable material. The end of each of the bars 72 adjacent either side of the bar 38 is provided with a beveled end 78 to maximize the length of the bars 72 and provide space for thermal expansion of the bars within the reduced space adjacent the bar 38. Each of the channels 36e and 36g houses a single grossly laminated back iron bar 80 which passes through the passages 39 and extends the entire length of the plate 28.

The fins 34 defining the channels 36 extend beyond the upper exposed surface of the bars 72, 80 to provide air channels and increased structural support for the LIM secondary 20. Each of the bars is secured to the top cap 24 at substantially its mid-point via a single bolt 82, the bolts 82 of which pass downwardly through the bars and into the top cap. A cross bar 84 formed from material similar to the top cap 24 is connected across the apex end 30a of the top cap to provide lateral stiffness for the LIM secondary while permitting the length of back iron bars to be maximized. The cross bar 84 is also substantially triangular in shape to maintain the apex formed at the one end 30a to accommodate articulation of the vehicle.

In operation, when the vehicle 18 is passing over a LIM primary and the LIM primary is energized, a magnetic circuit is formed between the LIM primary and the LIM secondary 20. The flux path in the magnetic circuits results in a linear thrust developed between the LIM primary and the LIM secondary. Since the LIM primary is fixed in space, the generated thrust causes the LIM secondary 20 to move longitudinally with respect to the primary and hence, provides a propulsive force to the vehicle 18. During this operation, heating occurs in the LIM secondary which, unless controlled through efficient LIM motor and top cap design as taught herein can cause distortion of the LIM secondary and the separation of the top cap from the core.

However, since the fins 34 of the present LIM secondary 20 structurally stabilize the top cap and additionally extend above the upper exposed surface of the back iron bars 72, 80, the heat generated in the LIM secondary 20 is dissipated more readily. This is due to the fact that an increased surface area is provided for heat dissipation and air channels are effected along the exposed upper surfaces of the bars 72, 80 parallel to the direction of travel of the vehicle 18. This design increases convective heat dissipation in the LIM secondary 20.

Also, when heating occurs during operation, the freedom provided at the ends of the back iron bars 72 permits thermal expansion of the bars 72 in substantially all directions. This reduces shear stresses placed on the LIM secondary and hence, further decreases the probability of distortions of the LIM secondary. Furthermore, the provision of a single mounting bolt 82 through the back iron bars 72, 80 precludes stress on the mounting means due to differential thermal expansion of the bars and the top cap 24 when heating occurs.

Although the LIM secondary top cap 24 has been described as being formed from aluminum, it should be realized that copper or other thermally and electrically conductive non-ferromagnetic materials can be used. Furthermore, it should be realized that the number of segments of back iron core placed in each channel can be varied provided that the back iron core is aligned so as to create a near continuous assembly whilst allowing a slight gap between the segments in each channel for the longitudinal expansion thereof. It should also be realized that the present LIM secondary can be fastened to a variety of vehicle chassis configurations.

We claim:

1. A top cap for a linear induction motor secondary, said top cap being formed from thermally and electrically conductive non-ferromagnetic material and having one side defining a surface to be spaced from a linear induction motor primary, the other side of said top cap including a plurality of spaced fins projecting therefrom, said fins extending along said top cap thereby defining a plurality of channels, each of said channels for receiving an element formed from magnetizable material.

2. The top cap as defined in claim 1 wherein said one side defines a substantially smooth, continuous, planar surface.

3. The top cap as defined in claim 2 wherein said fins are integrally formed with said other side.

4. The top cap as defined in claim 3 wherein said fins project orthogonally from said other side and extend substantially parallel to the longitudinal axis of said top cap.

5. The top cap as defined in claim 4 wherein said fins are evenly spaced.

6. The top cap as defined in claim 5 wherein said conductive non-ferromagnetic material is one selected from the group comprising aluminum and copper.

7. A linear induction motor secondary comprising:
a top cap formed from thermally and electrically conductive non-ferromagnetic material, said top cap having one side defining a surface to be spaced from a linear induction motor primary, the other side of said top cap having a plurality of spaced fins projecting therefrom, said fins extending along said top cap thereby defining a plurality of channels; and
a plurality of elements formed from magnetizable material, said elements being disposed in said channels and fastened to said top cap.

8. The linear induction motor as defined in claim 7 wherein said one side defines a substantially smooth, continuous, planar surface.

9. The linear induction motor secondary as defined in claim 8 wherein said fins are integrally formed with said other side.

10. The linear induction motor secondary as defined in claim 9 wherein said fins project beyond said core elements.

11. The linear induction motor secondary as defined in claim 10 wherein said fins project orthogonally from said other side and extend substantially parallel to the longitudinal axis of said top cap.

12. The linear induction motor secondary as defined in claim 11 wherein said top cap is formed from a non-ferromagnetic material selected from the group comprising aluminum and copper.

13. The linear induction motor secondary as defined in claim 12 wherein said fins are evenly spaced.

14. The linear induction motor secondary as defined in claim 13 wherein said elements of magnetizable material are formed from grossly laminated back iron bars.

15. A linear induction motor secondary as defined in claim 14 wherein said back iron bars are fastened to said top cap via a single substantially centrally located fastening pin.

16. A linear induction motor secondary as defined in claim 14 wherein a plurality of separated bars are provided in some of said channels, said bars being separated to facilitate the thermal expansion thereof.

17. A linear induction motor secondary as defined in claim 16 wherein one said of channels is positioned along the longitudinal axis of said top cap and wherein a single back iron bar extends along the length of the channels disposed on either side of said one channel.

18. A linear induction motor secondary as defined in claim 7 further comprising attachment means provided on said top cap for attaching said top cap to a portion of a vehicle, said attachment means permitting the transfer of propulsion and braking forces from said linear induction motor secondary to said vehicle.

19. The linear induction motor secondary as defined in claim 18 wherein said attachment means includes means for securing one end of said secondary to said vehicle directly and connecting means extending between said vehicle and said secondary for connecting the other end of said secondary to said vehicle.

20. A linear induction motor secondary as defined in claim 19 wherein said connecting means includes a pair of rods extending from one end of said top cap to said vehicle, said top cap including recesses for receiving said rods and wherein said means for securing includes a plurality of bolts near the other end of said top cap, said bolts extending upwardly through said top cap and engaging with said vehicle.

* * * * *